J. L. SOISALON-SOININEN.
PAPER KNIFE.
APPLICATION FILED FEB. 6, 1919.
1,328,548.
Patented Jan. 20, 1920.
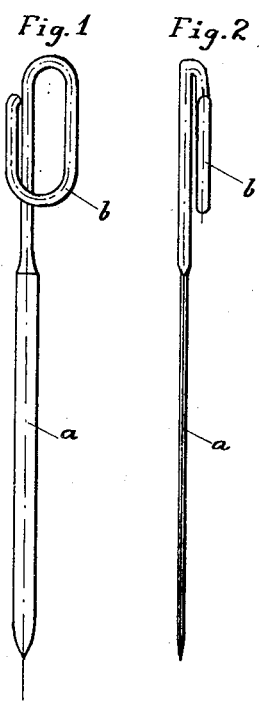
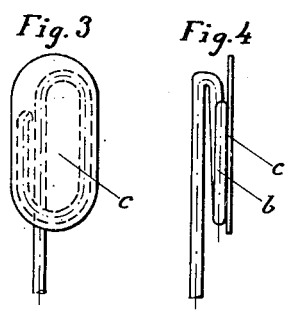
INVENTOR:
J. L. SOISALON-SOININEN
BY
ATTORNEY.

UNITED STATES PATENT OFFICE.

JUHANI LEOPOLD SOISALON-SOININEN, OF BOXBACKA, FINLAND.

PAPER-KNIFE.

1,328,548. Specification of Letters Patent. Patented Jan. 20, 1920.

Application filed February 6, 1919. Serial No. 275,452.

*To all whom it may concern:*

Be it known that I, JUHANI LEOPOLD SOISALON-SOININEN, citizen of the State of Finland, residing at Boxbacka, Finland, have invented a new and useful Paper-Knife; and I do hereby declare the following to be a full, clear, and exact description of the same.

The present invention relates to improvements in paper knives, the knife according to my invention having the advantage of being simple and cheap and capable of being easily fastened to the sheet of the book one is reading and the leaves of which one desires to separate.

The invention is shown in the accompanying drawing in which the Figures 1 and 2 represent side views of the knife, the Figs. 3 and 4 similar views (the upper end) of a preferred form. The knife is made, as is seen from the drawing, of a piece of steel wire (or some other suitable material) one end of which is bent to form a loop $b$ serving as the handle, and the other end of which is flattened along about half the length of the wire, so as to form the blade $a$, (If desired, the knife may be flattened along its entire length.) If the knife is put into the book so that some sheets come between the straight shaft and the loop $b$, the knife will be held in position without falling out as a usual paper knife does. In order to make the knife more convenient for handling and to improve its appearance, there may be soldered to the loop $b$ a small plain or ornamented metal sheet $c$, which reaches somewhat over the loop on all sides, (Figs. 3 and 4).

I claim:

1. A paper knife made of steel wire, one end thereof being bent to form a loop, the other end thereof being flattened along half the length of the wire, said loop serving as a handle, said flattened end serving as a blade, and said loop being so spaced from the body of the knife that the leaves of a book may be inserted between the loop and the said body, whereby the knife is adapted for cutting the leaves of a book.

2. A paper knife made of steel wire, one end thereof being bent to form a loop, the other end thereof being flattened along half the length of the wire, said loop serving as a handle, said flattened end serving as a blade, said loop being so spaced from the body of the knife that leaves of a book may be inserted between the loop and the said body, whereby the knife is adapted for cutting the leaves of a book, and a small metal sheet soldered to the loop and reaching beyond it, so as make the knife more convenient for handling and to improve its appearance.

In testimony whereof I have signed my name to this specification in the presence of two subscribing witnesses.

JUHANI LEOPOLD SOISALON-SOININEN.

Witnesses:
ANNA SCHROEDER,
KNU PAJUNEN.